United States Patent Office 3,704,205
Patented Nov. 28, 1972

3,704,205
METHOD OF PRODUCING L-GLUTAMIC ACID BY FERMENTATION
Teruo Shiro, Koichi Takinami, Eiichi Akutsu, Hiroe Yoshii, and Yasutsugu Yamada, Chigasaki-shi, Kanagawa-ken, Japan, assignors to Ajinomoto Co., Inc., Tokyo, Japan
No Drawing. Filed Mar. 2, 1970, Ser. No. 15,885
Claims priority, application Japan, Mar. 3, 1969, 44/16,054
Int. Cl. C12b 1/00
U.S. Cl. 195—114         2 Claims

ABSTRACT OF THE DISCLOSURE

The yield of L-glutamic acid from aerobic cultures of bacteria can be increased materially by small amounts of antioxidants in the nutrient medium. Anti-foaming agents not otherwise compatible with glutamic acid cultures may be employed in the presence of the antioxidants.

---

This invention relates to the production of L-glutamic acid by fermentation, and particularly to the culturing of L-glutamic acid producing bacteria on a nutrient medium under aerobic conditions.

L-glutamic acid is being produced on an industrial scale by fermentation. A nutrient medium including sources of assimilable carbon and nitrogen and the usual minor nutrients is inoculated with one of many available strains of bacterium and thereafter incubated at a suitable temperature under aerobic conditions. The L-glutamic acid accumulated in the medium after some time is recovered.

During the initial phase of the fermentation process, the microorganisms grow and multiply by segmentation while no significant amounts of L-glutamic acid are produced. During the second phase of the fermentation, L-glutamic acid is produced, but the cells no longer grow. The second phase is interrupted when the glutamic acid content of the medium no longer increases.

We believe that the large amounts of air or oxygen necessary for the aerobic culture gradually reduce the activity of enzymes which are instrumental in the production of glutamic acid and cannot be replenished by the resting cells during the second fermentation phase. Biologically important constituents of the microbial cells apparently are irreversibly oxidized by the oxygen present and made ineffective.

While the exact mechanism of biological damage by the gaseous oxygen has not been determined, the lipids of the cytoplasmic membranes, some vitamins essential to reactions with intracellular enzymes, and amino acids which are the most important cell constituents are known to be capable of oxidation, and may be destroyed or inactivated at a higher rate than they can be replenished by the resting cells during the second fermentation phase.

A mechanism as generally outlined above is therefore believed to account for the well known fact that a uniform rate of L-glutamic acid production cannot be maintained in a batch process during the second fermentation phase and that relatively early interruption of the process is necessary.

We have now found that the rate of L-glutamic acid production by all known and industrially used bacteria under aerobic conditions can be increased, and the yield improved significantly if the nutrient medium contains an effective amount of an antioxidant at least during the second phase of the fermentation process. The period during which L-glutamic acid is produced can be extended as compared to an otherwise identical fermentation system without antioxidant, and the assimilable carbon source may be replenished during the fermentation.

The antioxidants which we have used successfully are phenols and derivatives thereof, and amines. They include monohydroxybenzene derivatives such as 2-t-butyl-4-methylphenol, 4,4'-dihydroxy-3,3'-dimethyldiphenyl, 2,2'-dihydroxy-2,3'-t-butyl-5,5'-dimethyl-diphenylmethane, 2,6-di-t-butylphenol, 2,6-di-t-butylcresol; catechol and such derivatives thereof as nordihydroguaiaretic acid, protocatechuic acid, and butylcatechol; also hydroquinones such as 2,6-dichlorohydroquinone, 2,6-dimethylhydroquinone, 3-t-butyl-4-hydroxyanisole, 2,5-dihydroxydiphenyl, α-, β, γ-, and δ-tocopherol, 1,16-bis(2,5-dimethoxyphenyl)-hexadecane; pyrogallol and such derivatives as gallic acid and its methyl, ethyl, propyl, isobutyl, isoamyl, hexyl, octyl, lauryl, myristyl, hexadecyl, and octadecyl esters; also α- and β-naphthol, and 1,5-dihydroxynaphthalene; additionally m-aminophenol, p-aminophenol, and N-butyl-p-aminophenol; sesamol, and gossypol.

Typical amines for use in the fermentation mixtures of the invention include naphthylamines, such as α-naphthylamine and N-phenyl-α-naphthylamine; secondary aromatic amines such as p-isopropoxy-diphenylamine, diphenylamine, p-hydroxy-diphenylamine; phenylene diamines such as di-sec.-butyl-p-phenylenediamine, N,N'-di-β-naphthyl-p-phenylenediamine, N,N'-diphenyl-p-phenylenediamine; quinoline derivatives such as 6-ethoxy-2,3,4-trimethyl-1,2-dihydroquinoline; urea derivatives such as semicarbazide, diphenylcarbazide and diphenylenimid; phenothiazine hydrazine derivatives such as tetraphenylhydrazine.

Other examples will be given hereinbelow.

As is evident from the above enumeration of suitable organic and inorganic antioxidants, they differ greatly in their chemical structure. Their common features reside in their ability of binding oxygen and in their lack of significant toxicity to the microorganisms when used in effective amounts. It is believed that they inhibit the autoxidation of the lipids, but the exact mechanism of their effectiveness has not yet been established.

When the antioxidants are present in the fermentation media, antifoaming agents not heretofore useful in glutamic acid fermentation may be used successfully. Polyoxypropylene and its derivatives are known as excellent antifoaming agents, but they inhibit the normal growth of L-glutamic acid producing bacteria. They may be employed safely in our new method.

In addition to polypropyleneglycol, the following related compounds have been used successfully in the fermentation process of the invention: polyoxypropylene-polyoxyethylene ether, polyoxypropylenebutyl ether, polyoxypropylene-polyoxyethylene-butyl ether, polyoxypropylene-cetyl ether, polyoxypropylene-polyoxyethylene-cetyl ether, polyoxypropylene-glyceryl ether, polyoxypropylene-polyoxyethylene-glyceryl ether, polyoxypropylene-trimethylolpropane ether, polyoxypropylene-polyoxyethylene-trimethylolpropane ether, polyoxypropylene pentaerythrityl ether, polyoxypropylene-polyoxyethylene pentaerythrityl ether, polyoxypropylene-polyoxyethylene sorbityl ether, and others.

Not more than 0.5 gram antioxidant can normally be employed per liter of nutrient medium, but the amount of antioxidant which produces the best yields of L-glutamic acid must be determined experimentally for each specific set of operating conditions. It varies with the chemical nature of the antioxidant, with the microorganism used and with the composition of the nutrient medium.

When the culture medium contains more than 0.5 g./l. of an antioxidant of the invention, for example 3-t-butyl-4-hydroxyanisole, bacterial growth is inhibited. No inhibition is found with 0.1 g./l. for example, of α-tocopherol.

The antioxidant may be added to the nutrient medium initially or during fermentation. It does not significantly affect the growth phase when used in effective amounts of 0.01 to 0.5 gram per liter, and functions essentially in the glutamic acid producing phase of the fermentation process.

The following examples further illustrate the invention, but it should be understood that the invention is not limited to the examples.

EXAMPLE 1

An aqueous culture medium was made up to consist of 100 g./l. cane molasses, 6 g./l. urea, 1 g./l. $KH_2PO_4$, 0.4 g./l. $MgSO_4 \cdot 7H_2O$, 10 mg./l. $FeSO_4 \cdot 7H_2O$, 34 ml./l. soybean hydrolyzate ("Aji-eki"), and 80 μg./l. thiamine. The antioxidants enumerated in Table 1 were added to 20 ml. batches of the stock solution in the amounts indicated, and the several media were transferred to 500 ml. shaking flasks and sterilized at 120° C. for 10 minutes. Each culture medium was inoculated with *Brevibacterium lactofermentum* No. 2256 (ATCC 13869) and was aerobically cultured with shaking at 31.5° C. After 5 hours, 4 g./l. polyoxyethylene sorbitan palmitate were added to each medium. A pH of 6.5–8.0 was maintained by adding 450% urea in aqueous solution.

In addition to the name and concentration of the antioxidant, Table 1 shows the conversion rate of the sucrose to L-glutamic acid during the fermentation period which varied from 22 to 30 hours, and was determined by the rate of glutamic acid accumulation in the usual manner. A control batch was processed in the same manner, but without antioxidant.

TABLE 1

| Antioxidant | Concentration, mg./ml. | Conversion, percent |
| --- | --- | --- |
| Gallic acid | 0.5 | 48.8 |
| Methyl gallate | 0.1 | 48.8 |
| Ethyl gallate | 0.1 | 49.5 |
| Propyl gallate | 0.1 | 51.0 |
| Isobutyl gallate | 0.05 | 49.9 |
| Isoamyl gallate | 0.05 | 50.0 |
| Hexyl gallate | 0.05 | 48.5 |
| Octyl gallate | 0.01 | 48.5 |
| Lauryl gallate | 0.01 | 49.4 |
| Tetradodecyl gallate | 0.01 | 48.0 |
| Hexadecyl gallate | 0.01 | 50.0 |
| Octadecyl gallate | 0.01 | 47.9 |
| None | 0 | 45.1 |

EXAMPLE 2

20 ml. batches of the stock medium of Example 1 were inoculated with *Brevibacterium flavum* No. 2247 (ATCC 14067) in a procedure analogous to that of Example 1. After five hours of incubation, the antioxidants listed in Table 2 were added in the indicated amounts, and the sucrose available was converted to glutamic acid at the rate shown.

TABLE 2

| Antioxidant | Concentration, mg./ml. | Conversion, percent |
| --- | --- | --- |
| Phenothiazine | 0.05 | 49.0 |
| Alkyl-dithiozinc phosphate | 0.1 | 48.0 |
| None | 0 | 45.0 |

EXAMPLE 3

The general procedure of Example 2 was repeated with the antioxidants listed in Table 3, the nutrient stock medium of Example 1 being inoculated with *Corynebacterium sp.* No. 417 (NRRL B–3719) five hours prior to admixture of the antioxidant.

TABLE 3

| Antioxidant | Concentration, mg./ml. | Conversion, percent |
| --- | --- | --- |
| Butyl gallate | 0.1 | 48.1 |
| Phenothiazine | 0.1 | 49.5 |
| Butylhydroxyanisole | 0.05 | 51.2 |
| Diphenylamine | 0.05 | 54.0 |
| α-Tocopherol | 0.05 | 52.3 |
| None | 0 | 44.0 |

EXAMPLE 4

In a further modification of the method of Example 1, batches of the nutrient stock medium were inoculated with *Brevibacterium lactofermentum* No. 2256 (ATCC 13869). Twelve hours later, the antioxidants listed in Table 4 were added, and each broth was further cultured for 24 hours. The results are shown in Table 4 together with those for a control culture.

TABLE 4

| Antioxidant | Concentration, mg./ml. | Conversion, percent |
| --- | --- | --- |
| Protocatechuic acid | 1 | 50.3 |
| Butylcatechol | 0.1 | 48.0 |
| Nordihydroguaiaretic acid | 0.1 | 48.4 |
| 1,16-bis(2,5-dihydroxyphenyl)hexadecane | 0.05 | 48.3 |
| Butylhydroxyanisole | 0.05 | 51.2 |
| Butylhydroxytoluene | 0.05 | 49.8 |
| None | 0 | 46.2 |

EXAMPLE 5

As in Example 4, two batches of the stock medium were inoculated with *Brevibacterium saccharolyticum* No. 7636 (ATCC 14066) and cultured for eight hours before 0.1 mg./ml. α-tocopherol were added to one batch. When the fermentation was interrupted, the sucrose in the medium containing α-tocopherol was converted to L-glutamic acid in an amount of 50.5%, whereas only 42.0% had been converted in the control.

EXAMPLE 6

A stock nutrient medium was made up from 100 g./l. glucose, 1 g./l. $KH_2PO_4$, 0.4 g./l. $MgSO_4 \cdot 7H_2O$ 10 mg./l. $FeSO_4 \cdot 7H_2O$, 20 mg./l. $MnSO_4 \cdot 4H_2O$, 6 g./l. urea, 5 ml./l. "Aji-eki," 100 μg./l. thiamin, and 5 μg./l. biotin. 20 ml. batches were sterilized in 500 ml. shaking flasks and inoculated with *Brevibacterium lactofermentum* No. 2256 (ATCC 13869) as described in Example 1. The antioxidant mixtures listed in Table 5 were respectively added to the media after 8 hours of cultivation. The conversion rates of the available glucose after 40 hours of cultivation are listed in Table 4 with the corresponding information for a control without antioxidant.

TABLE 5

| Antioxidant | Concentration mg./ml. | Conversion, percent |
| --- | --- | --- |
| L-ascorbic acid/lauryl gallate | 0.05/0.05 | 51.2 |
| L-ascorbic acid/isoamyl-gallate | 0.05/0.05 | 51.2 |
| L-ascorbic acid/butylhydroxyanisole | 0.05/0.05 | 50.6 |
| L-ascorbic acid/α-tocopherol | 0.05/0.05 | 51.3 |
| Lauryl gallate/butylhydroxyanisole | 0.03/0.07 | 50.2 |
| Lauryl gallate/α-tocopherol | 0.03/0.07 | 48.4 |
| Butylhydroxyanisole/isoamylgallate | 0.02/0.1 | 48.3 |
| Butylhydroxyanisole/α-tocopherol | 0.02/0.1 | 50.0 |
| Isoamyl gallate/α-tocopherol | 0.01/0.1 | 48.4 |
| Propyl gallate/butylhydroxyanisole | 0.03/0.1 | 49.8 |
| None | 0 | 46.5 |

EXAMPLE 7

Twelve 285 ml. batches of a culture medium were each made up from water, 0.3 g. $KH_2PO_4$, 0.12 g.

$MgSO_4 \cdot 7H_2O$ 3 mg. $FeSO_4 \cdot 7H_2O$, 3 mg. $MnSO_4 \cdot 4H_2O$, 1.02 ml. "Aji-eki", 24 γ thiamin, a small amount of a conventional anti-foaming agent, and 76.4 g. cane molasses (55% sugar), transferred to one liter glass jar fermenters, sterilized, and inoculated wtih *Brevibacterium lactofermentum* No. 2256 (ATCC 13869) or *Micrococcus glutamicus* No. 534 (ATCC 13032). Each culture was agitated at 1500 r.p.m. and aerated with 300 ml. air per minute at 31.5° C. Gaseous ammonia was supplied with the air at a rate to maintain the pH at 7.8.

Five hours after inoculation, 1.2 g. polyoxyethylene sorbitan palmitate was added to the content of each fermenter, and four hours thereafter, the antioxidants listed in Table 6 were added to five of the fermenters. The total culturing time and the conversion rate of the available sugar are also listed in Table 6.

TABLE 6

| Antioxidant | Concentration, mg./ml. | Time, hours | Conversion, percent B. lacto-fermentum | Conversion, percent M. glutamicus |
|---|---|---|---|---|
| Lauryl gallate | 0.1 | 22 | 48.5 | 45.3 |
| Isoamyl gallate | 0.1 | 23½ | 47.5 | 45.2 |
| Butylhydroxyanisole | 0.05 | 22 | 48.1 | 43.2 |
| α-Tocopherol | 0.05 | 23½ | 49.7 | 47.9 |
| None | 0 | 28 | 42.2 | 43.0 |

EXAMPLE 8

Two 285 ml. batches of the culture medium described in Example 7 were inoculated with *Brevibacterium flavum* No. 2247 (ATCC 14067) and incubated under the conditions of Example 7. Nine hours after inoculation, 0.03 g. butylhydroxyanisole dissolved in 3 ml. ethanol were added to one culture, and 15 g. sugar to each.

After 38 hours, 85 mg./ml. L-glutamic acid had accumulated in the medium containing the antioxidant for a conversion rate of 44.7%. The glutamic acid concentration in the control medium reached a maximum of 60 mg./ml. after 46.5 hours for a conversion rate of 31.6%.

EXAMPLE 9

Two batches of the nutrient medium of Example 7 were inoculated with *Brevibacterium lactofermentum* No. 2256 (ATCC 13869) and incubated as described above until the residual sugar concentration was reduced to 5%. 15 mg. α-tocopherol were then added to one culture and 15 g. sugar to each. The culture containing the antioxidant reached an L-glutamic acid concentration of 83 mg./ml. in 42 hours (43.7% conversion) whereas the control contained a maximum of 60 mg./ml. after 47 hours (31.6% conversion).

EXAMPLE 10

A nutrient medium was made up from 25 g./l. glucose, 6.3 g./l. ammonium acetate, 13.5 g./l. sodium acetate, 0.9 g./l. acetic acid, 5 g./l. urea, 15 ml./l. "Aji-eki," 200 μg./l. thiamin.HCl, 2.5 μg./l. biotin, 1 g./l. $KH_2PO_4$, 1 g./l. $MgSO_4 \cdot 7H_2O$, and 2 p.p.m. each of $Fe^{++}$. The pH was 7.3.

20 liters of the medium were sterilized in a 40 liter fermenter at 110° C. for 10 minutes, inoculated with 1 liter of a seed culture broth of *Brevibacterium lactofermentum* No. 2256 (ATCC 13869). and incubated at 31.5° C. with agitation (350 r.p.m.) and aeration (10,000 ml./min.).

Eight hours after inoculation, a solution of 356 g./l. acetic acid and 458 g./l. ammonium acetate (pH 5) was added to the culture at an automatically controlled rate to maintain a pH of 7.9. The supply of the solution was stopped 40 hours after the inoculation. 41 hours later, glutamic acid had accumulated in the solution in an amount corresponding to a 48.3% conversion of all available carbon sources.

The same procedure was repeated, but six hours after the inoculation, 1 g. α-tocopherol was added to the broth. When the fermentation was terminated, 90.4 g./l. L-glutamic acid had been formed for a conversion rate of 54.4% for the combined carbon sources.

EXAMPLE 11

Four 20 liter batches of the nutrient medium described in Example 10 were inoculated with the same microorganism and cultured at 31.5° C. with agitation (500 r.p.m.) and aeration (10 l./min.). After six hours, the antioxidants listed in Table 7 were added to three of the culture media in amounts of 0.1 g./l. and acetic acid-ammonium acetate solution was supplied as described above, starting 7.25 hours after inoculation. The procedure of Example 10 was followed otherwise. Table 7 shows the ultimate concentrations of L-glutamic acid (GA) and the converison rate of the available carbon source for the four cultures.

TABLE 7

| Antioxidant | GA, g./l. | Conversion, percent |
|---|---|---|
| α-Tocopherol | 96.4 | 45.3 |
| Butylhydroxyanisole | 94.8 | 45.0 |
| Isoamyl gallate | 98.7 | 46.7 |
| None | 77.0 | 37.6 |

EXAMPLE 12

An aqueous culture medium was prepared from 6.8 g./l. sodium acetate, 8.2 g./l. potassium acetate, 1 g./l. ammonium acetate, 15 mg./l. "Aji-eki," 200 μg./l. thiamin. HCl, 3.5 μg./l. biotin, 3 g./l. $K_2SO_4$, 1 g./l. $MgSO_4 \cdot 7H_2O$, and 2 p.p.m. each of $Fe^{++}$ and $Mn^{++}$ (pH 8.0). 20 liters of the medium were sterilized in a fermenter, inoculated with *Brevibacterium lactofermentum* No. 2256 (ATCC 13869), and incubated under aerobic conditions substantially as described above. After two hours, the pH had dropped to 7.9 and the acetic acid-ammonium acetate solution described in Example 10 was supplied as described in that example whose procedure was followed to the end. The broth then contained 80.0 g./l. L-glutamic acid (47.8% conversion of the available carbon sources).

When the above procedure was repeated, but 2 g. α-tocopherol were added six hours after inoculation, the ultimate glutamic acid concentration was 84.0 g./l. (48.8% conversion).

When the amount of α-tocopherol was increased to 4 g., and the acetic acid-ammonium acetate solution was supplied until 42 hours after the inoculation, the glutamic acid content of the broth after 46 hours was 91.0 g./l. as compared to 84.4 g./l. in a control without α-tocopherol. Both cultures contained 65 g./l. glutamic acid after 24 hours, indicating that the glutamic acid formed in the last 22 hours of the fermentation period amounted to 26.0 and 19.4 g./l. respectively.

EXAMPLE 13

Three 30 ml. batches of a culture medium containing 30 g./l. of a commercial mixture of liquid n-paraffins, ($C_{14}$–$C_{18}$), 5 g./l. $NH_4NO_3$, 25 g./l. $KH_2PO_4$, 1 g./l. $MgSO_4 \cdot 7H_2O$, 5 μg./l. thiamin.HCl, and 2 p.p.m. each of $Fe^{++}$ and $Mn^{++}$ were sterilized in 500 ml. shaking flasks, inoculated with *Corynebacterium hydrocarboclastus* M104 (ATCC 15110), and incubated at 30° C. under aerobic conditions.

After 21 hours, 0.1 g./l. α-tocopherol and butylhydroxyanisole were added to the contents of two flasks respectively. After 72 hours, the concentration of L-glutamic acid in each broth was determined, and the conversion of the paraffins was calculated. The values obtained were 15.5 g./l. (52%) for α-tocopherol, 14.8 g./l. (49%) for butylhydroxyanisole, and 12.0 g./l. (40%) for the control.

EXAMPLE 14

A culture medium was prepared to contain 8.2 g./l. potassium acetate, 1 g./l. $(NH_4)_2SO_4$, 8.0 g./l. $Na_2SO_4$, 1 g./l. $KH_2PO_4$, 1 g./l. $MgSO_4 \cdot 7H_2O$, 0.01 g./l. $FeSO_4 \cdot 7H_2O$, 0.01 g./l. $MnSO_4 \cdot 4H_2O$, 0.36 g./l. soybean protein hydrolyzate (as total introgen), 4 γ/l. biotin, 200 γ/l. thiamin.HCl, and 0.5 g./l. polyoxypropylene-polyoxyethylene-pentaerythrityl ether, and adjusted to pH 8.0.

Four batches of 285 ml. of medium each were sterilized, inoculated with *Brevibacterium lactofermentum* No. 2256 (ATCC 13869), and cultured at 31.5° C. with stirring (12,000 r.p.m.) and aeration (300 ml./min.) while the pH was prevented for 40 hours from rising above 7.8 by additions of a sterile solution of pH 5.0 prepared from 52.5 g. glacial acetic acid, 67.4 g. ammonium acetate, and 150 ml. water. One hour after the addition had been stopped, the amounts of L-glutamic acid in the several broths were determined and the conversion rate of the carbon sources available was calculated.

One gram/liter α-tocopherol was added to three of the four batches 4, 8 and 12 hours respectively after the inoculation. These batches were found to contain 89.8, 94.0 and 84.3 g./l. L-glutamic acid for respective conversion rates of 50.8, 48.4 and 49.5%. The control batch without tocopherol contained only 71.5 g./l. glutamic acid (40.3%).

EXAMPLE 15

15 liters of the nutrient medium of Example 14 were placed in a stainless fermenter of 30 liter capacity, sterilized at 110° C., for 10 minutes under pressure, and inoculated with 0.75 liter of a seed culture of *Brevibacterium lactofermentum* No. 2256 (ATCC 13869). The medium was cultured at 31.5° C. with stirring (350 r.p.m.) and aeration (7.5 liters per minute), and its pH was maintained at 7.8 by automatic additions of a solution of which five liters were prepared from 1780 g. glacial acetic acid, 2290 g. ammonium acetate, and water (pH 5). Seven hours after inoculation, 50 mg./l. L-ascorbic acid and 50 mg./l. lauryl gallate were added to the culture medium. The additions of acetic acid and ammonium acetate ended 40 hours after inoculation. The fermentation was terminated one hour later.

The total amount of acetic acid consumed was 4240 grams, and the culture broth contained 94.0 g./l. L-glutamic acid (46.6% yield).

When 0.5 g./dl. polypropylene-glycol was substituted as an anti-foaming agent for the polyoxypropylene-polyoxyethylene-pentaerythrityl ether, and 0.1 g./l. diphenylamine was used as the antioxidant instead of the ascorbic acid and lauryl gallate, 200 g. acetic acid were consumed per liter, and 99.5 g./l. L-glutamic acid were produced. Further substitution of 0.1 g./l. i-amyl gallate for the diphenylamine gave 97.3 g./l. glutamic acid from 194 g. acetic acid consumed.

As is evident from the preceding examples, the several antioxidants of the invention are qualitatively equivalent in their effects on cultures of glutamic acid producing bacteria, and the several bacteria employed in current industrial practice respond equally to the presence of the antioxidants. In addition to the microorganisms specifically referred to in the examples, closely analogous results were achieved with the known, glutamic acid producing microorganisms of the genus Micrococcus.

Glutamic acid was conventionally recovered from the broths prepared as described in the several examples by separating the cells from the liquid by filtration or centrifuging, partly evaporating the clear liquid, and adjusting the pH of the concentrate to the isoelectric point of glutamic acid whereby crystallization was induced in the usual manner. The antioxidant, as far as still present, had no effect on the work-up of the fermentation broth.

Specimen cultures of all microorganisms mentioned in the examples have been deposited with the depository agencies indicated in abbreviated form after the names of the microorganisms together with the accession numbers, and are available to qualified persons from the depository agencies without our permission.

What is claimed is:

1. In a method of producing L-glutamic acid by culturing a glutamic acid producing strain of Brevibacterium, Corynebacterium, or Micrococcus on an aqueous nutrient medium containing assimilable sources of carbon and nitrogen, and minor organic and inorganic nutrients under aerobic conditions, and by recovering the glutamic acid from the culture broth so obtained, the improvement which comprises maintaining in said nutrient medium an amount of butylhydroxyanisole of 0.01 to 0.5 grams per liter, said amount being effective to increase the yield of said glutamic acid and free from significant toxicity to said microorganism when present in said amount.

2. In a method as set forth in claim 1, said culture medium including as an anti-foaming agent an effective amount of polyoxypropylene or a derivative thereof.

References Cited

UNITED STATES PATENTS

| | | | |
|---|---|---|---|
| 3,189,527 | 6/1965 | Lockwood et al. | 195—114 X |
| 3,551,292 | 12/1970 | Kamimura et al. | 195—30 |
| 3,117,915 | 1/1964 | Shiio et al. | 195—30 |
| 3,201,323 | 8/1965 | Douros et al. | 195—28 R X |

OTHER REFERENCES

Huang: "Prog. in Ind. Micro.," Hockenhull-Editor, 1964, pp. 61–66.

Chemical Abstracts 56:15907b (1962).
Chemical Abstracts 59:15097e (1963).
Chemical Abstracts 57:2636i (1962).
Chemical Abstracts 58:8189e (1963).

Chambers et al.: (in) "Dev. in Industrial Microbiology," 5:85–93 (1964).

A. LOUIS MONACELL, Primary Examiner

M. D. HENSLEY, Assistant Examiner

U.S. Cl. X.R.

195—28 R, 47, 29